US012756913B2

(12) United States Patent
Wang

(10) Patent No.: US 12,756,913 B2
(45) Date of Patent: Oct. 6, 2026

(54) CAMERA MODULE, CONTROL METHOD AND APPARATUS, AND ELECTRONIC DEVICE

(71) Applicant: VIVO MOBILE COMMUNICATION CO., LTD., Guangdong (CN)

(72) Inventor: Danmei Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 14 days.

(21) Appl. No.: 18/947,136

(22) Filed: Nov. 14, 2024

(65) Prior Publication Data

US 2025/0071403 A1 Feb. 27, 2025

Related U.S. Application Data

(63) Continuation of application No. PCT/CN2023/096294, filed on May 25, 2023.

(30) Foreign Application Priority Data

May 31, 2022 (CN) ........................ 202210614104.6

(51) Int. Cl.
*H04N 23/54* (2023.01)
*H04N 23/52* (2023.01)
(Continued)

(52) U.S. Cl.
CPC ............ *H04N 23/54* (2023.01); *H04N 23/52* (2023.01); *H04N 23/55* (2023.01); *H04N 23/57* (2023.01); *H04N 23/67* (2023.01)

(58) Field of Classification Search
CPC ........ H04N 23/52; H04N 23/54; H04N 23/55; H04N 23/57; H04N 23/67; H04N 23/68
(Continued)

(56) References Cited

U.S. PATENT DOCUMENTS 9,736,345 B1 * 8/2017 Topliss ................. H04N 23/687
2017/0054883 A1 * 2/2017 Sharma .................. H04N 23/66
(Continued)

FOREIGN PATENT DOCUMENTS

CN 108242907 A 7/2018
CN 109348104 A 2/2019
(Continued)

OTHER PUBLICATIONS

International Search Report and Written Opinion for PCT Application No. PCT/CN2023/096294, Mailed Sep. 5, 2023, 15 pages.
(Continued)

*Primary Examiner* — Anthony J Daniels
(74) *Attorney, Agent, or Firm* — BROOKS KUSHMAN P.C.

(57) ABSTRACT

A camera module, a control method and apparatus, and an electronic device. The camera module includes: a base; a lens, where the lens is disposed on the base; a substrate, where the substrate and the lens are sequentially arranged along an optical axis direction of the lens, and the substrate is movable along the optical axis direction of the lens; a photosensitive chip, where the photosensitive chip is disposed on the substrate, and the photosensitive chip is located between the lens and substrate; and a capacitor assembly, where the capacitor assembly includes a first capacitor plate and a second capacitor plate, the first capacitor plate is disposed on the substrate, the second capacitor plate is disposed on the base, and the first capacitor plate is opposite the second capacitor plate.

16 Claims, 3 Drawing Sheets

(51) Int. Cl.

| | |
|---|---|
| ***H04N 23/55*** | (2023.01) |
| ***H04N 23/57*** | (2023.01) |
| ***H04N 23/67*** | (2023.01) |

(58) Field of Classification Search

USPC .......................................................... 348/374

See application file for complete search history.

(56) References Cited

U.S. PATENT DOCUMENTS

| | | | | |
|---|---|---|---|---|
| 2021/0392251 | A1* | 12/2021 | Wang ..................... | H04N 23/51 |
| 2022/0103744 | A1* | 3/2022 | Hsu ........................ | G03B 13/36 |
| 2022/0191373 | A1 | 6/2022 | Zhang et al. | |
| 2023/0148358 | A1* | 5/2023 | Sharma .................. | H04N 23/55<br>348/345 |

FOREIGN PATENT DOCUMENTS

| | | | |
|---|---|---|---|
| CN | 111601021 | A | 8/2020 |
| CN | 112235511 | A | 1/2021 |
| CN | 112531981 | A | 3/2021 |
| CN | 112822350 | A | 5/2021 |
| CN | 113572938 | A | 10/2021 |
| CN | 114845030 | A | 8/2022 |
| CN | 114928689 | A | 8/2022 |
| WO | 2021092855 | A1 | 5/2021 |

OTHER PUBLICATIONS

First Chinese Office Action for Chinese Application No. 202210614104.6 mailed Jul. 12, 2024. 15 pages.

* cited by examiner

CAMERA MODULE, CONTROL METHOD AND APPARATUS, AND ELECTRONIC DEVICE

CROSS-REFERENCE TO RELATED APPLICATIONS

This application is a continuation of International Application No. PCT/CN2023/096294 filed on May 25, 2023, which claims priority to Chinese Patent Application No. 202210614104.6 filed on May 31, 2022, which are incorporated herein by reference in their entireties.

TECHNICAL FIELD

This application pertains to the field of terminal technologies, and specifically, to a camera module, a control method and apparatus, and an electronic device.

BACKGROUND

For smartphones, camera capabilities are receiving increasing attention, making the design of camera hardware modules more critical. During the focusing process, the closed-loop feedback system used in the related art is achieved through Hall technology. The assembly process of Hall technology is complex, results in a large occupied volume in the camera hardware module and magnetic interference between cameras, and is significantly affected by temperature drift and relatively costly.

SUMMARY

An objective of the embodiments of this application is to provide a camera module, a control method and apparatus, and an electronic device.

According to a first aspect, an embodiment of this application provides a camera module, including:

a base;

a lens, where the lens is disposed on the base;

a substrate, where the substrate and the lens are sequentially arranged along an optical axis direction of the lens, and the substrate is movable along the optical axis direction of the lens;

a photosensitive chip, where the photosensitive chip is disposed on the substrate, and the photosensitive chip is located between the lens and substrate; and a capacitor assembly, where the capacitor assembly includes a first capacitor plate and a second capacitor plate, the first capacitor plate is disposed on the substrate, the second capacitor plate is disposed on the base, and the first capacitor plate is opposite the second capacitor plate.

According to a second aspect, an embodiment of this application provides a control method of camera module, which is applied to the camera module according to the foregoing embodiment and includes:

detecting a change in capacitance of the capacitor assembly; and controlling, based on the detected change in capacitance of the capacitor assembly, the substrate to move along an optical axis direction of the lens.

According to a third aspect, an embodiment of this application provides a control apparatus of camera module, which is applied to the camera module according to the foregoing embodiment and includes:

a detection module configured to detect a change in capacitance of the capacitor assembly; and a control module configured to control, based on the detected change in capacitance of the capacitor assembly, the substrate to move along an optical axis direction of the lens.

According to a fourth aspect, an embodiment of this application provides an electronic device including a processor and a memory, where the memory stores a program or instructions capable of running on the processor, and when the program or instructions are executed by the processor, the steps of the method according to the foregoing embodiment are implemented.

According to a fifth aspect, an embodiment of this application provides a readable storage medium, where the readable storage medium stores a program or instructions, and when the program or instructions are executed by a processor, the steps of the method according to the foregoing embodiment are implemented.

According to a sixth aspect, an embodiment of this application provides an electronic device, including the camera module according to the foregoing embodiment.

Figure 1:
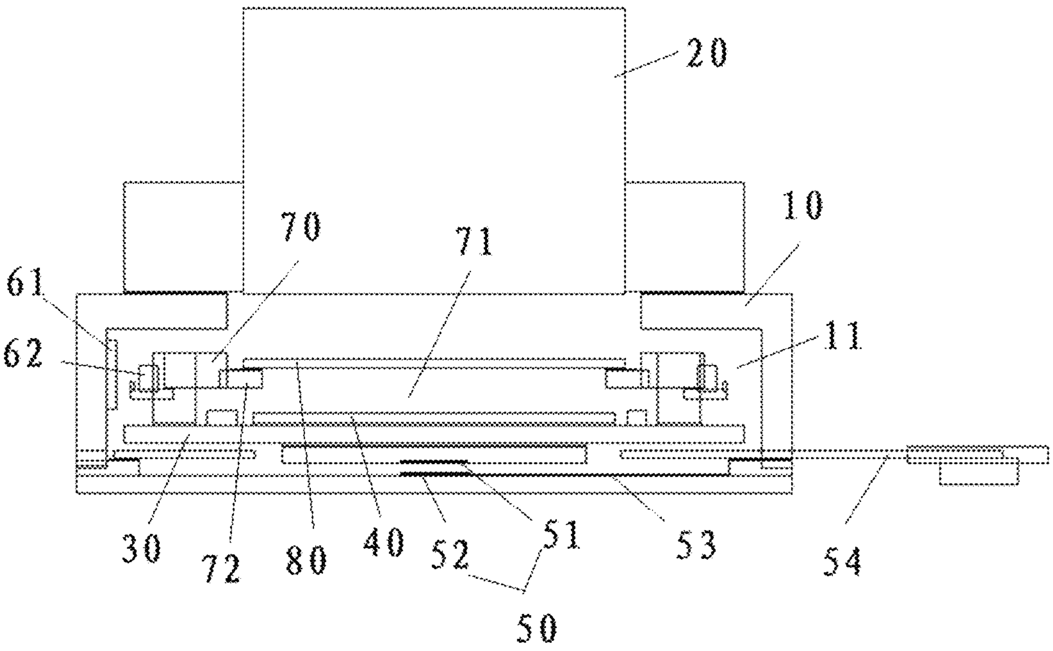
FIG. 1 is a schematic structural diagram of a camera module according to an embodiment of this application.

REFERENCE SIGNS base 10; accommodating cavity 11;

lens 20;

substrate 30;

photosensitive chip 40;

capacitor assembly 50; first capacitor plate 51; and second capacitor plate 52;

connection plate 53; circuit board 54;

first magnet 61; second magnet 62;

bracket 70; placement groove 71; support table 72; and filter 80.

DETAILED DESCRIPTION

The following clearly describes the technical solution in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

The terms “first”, “second”, and the like in this specification and claims of this application are used to distinguish between similar objects rather than to describe a specific order or sequence. It should be understood that data used in this way are interchangeable in appropriate circumstances such that the embodiments of this application can be implemented in other orders than the order illustrated or described herein. In addition, "and/or" in the specification and claims represents at least one of connected objects, and the character "/" generally indicates that the contextually associated objects have an "or" relationship.

The following describes in detail the camera module provided in the embodiments of this application through specific embodiments and application scenarios thereof with reference to the FIGS. 1 to 6.

As shown in FIGS. 1 to 4, the camera module in the embodiment of this application includes a base 10, a lens 20, a substrate 30, a photosensitive chip 40, and a capacitor assembly 50. The lens 20 is arranged on the base 10. The substrate 30 and the lens 20 are sequentially arranged along an optical axis direction of the lens 20. The substrate 30 and the lens 20 can be spaced apart along the optical axis direction of the lens 20. The substrate 30 can move along the optical axis direction of the lens 20. The photosensitive chip 40 is arranged on the substrate 30. Movement of the substrate 30 along the optical axis direction of the lens 20 allows the photosensitive chip 40 to approach or leave the lens 20. The photosensitive chip 40 is located between the lens 20 and the substrate 30. Movement of the substrate 30 drives the photosensitive chip 40 to approach or leave the lens 20, facilitating adjustment of the distance between the photosensitive chip 40 and the lens 20, thereby achieving focus. Light incident through the lens 20 can be transmitted to the photosensitive chip 40, forming an image via the photosensitive chip 40.

The capacitor assembly 50 includes a first capacitor plate 51 and a second capacitor plate 52. The first capacitor plate 51 and the second capacitor plate 52 may be rectangular plates of the same shape and size. The first capacitor plate 51 and the second capacitor plate 52 may be conductive material plates, such as metal plates. The first capacitor plate 51 may be arranged on the substrate 30. The first capacitor plate 51 may be disposed on a side of the substrate 30 close to the base 10 and attached to the surface of the substrate 30. The second capacitor plate 52 may be arranged on the base 10. The first capacitor plate 51 and the second capacitor plate 52 can be arranged opposite each other, such that the capacitor assembly 50 can be formed by the first capacitor plate 51 and the second capacitor plate 52. The first capacitor plate 51 and the second capacitor plate 52 may be arranged parallel to the substrate 30. Movement of the substrate 30 can drive the first capacitor plate 51 to move, thereby changing the distance between the first capacitor plate 51 and the second capacitor plate 52, causing a change in the capacitance of the capacitor assembly 50 formed by the first capacitor plate 51 and the second capacitor plate 52. The change in distance between the first capacitor plate 51 and the second capacitor plate 52 can be obtained based on the change in capacitance of the capacitor assembly 50, thus obtaining the change in distance between the photosensitive chip 40 and the lens 20. When the substrate 30 moves, it drives the first capacitor plate 51 to move, causing a change in the distance between the first capacitor plate 51 and the second capacitor plate 52, thereby resulting in a change in capacitance. Based on the change in capacitance, the position of the substrate 30 can be detected, thereby achieving feedback closed-loop operation.

In the camera module of the embodiments of this application, a capacitor is formed by arranging the first capacitor plate 51 and the second capacitor plate 52 opposite each other. The distance between the first capacitor plate 51 and the second capacitor plate 52 changes, leading to a change in the capacitance of the capacitor assembly 50. The relative position change between the first capacitor plate 51 and the second capacitor plate 52 can be obtained based on the change in capacitance of the capacitor assembly 50, so as to obtain a distance between the photosensitive chip 40 and the lens 20. During focusing, the distance change between the photosensitive chip 40 and the lens 20 can be obtained based on the change in capacitance of the capacitor assembly 50. This eliminates the need for Hall magnets and Hall elements in the camera module, resulting in a simple assembly process, a small module volume, no magnetic interference between cameras, minimal impact from temperature drift, low costs, and improved camera performance and user experience. The capacitor has two thin capacitor plates, which help reduce the size or dimensions of the module and can be applied to large-stroke camera modules. In this application, mainly based on the working principle of the capacitor, a signal acquisition feedback system is designed, and after an acquired signal (the amount of change in capacitance) is processed, a capacitive closed-loop focusing system design can be realized.

Figure 2:
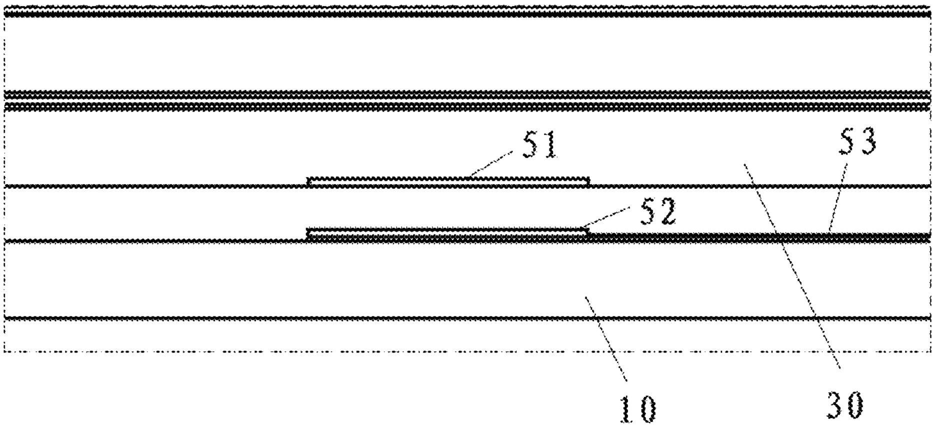
FIG. 2 is a schematic diagram of arrangement of a first capacitor plate and a second capacitor plate.
Figure 3:
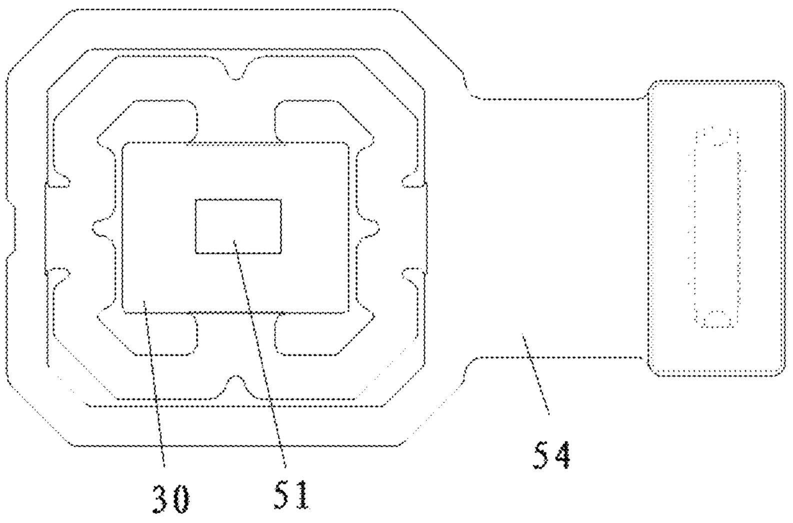
FIG. 3 is a schematic diagram of arrangement of a first capacitor plate.
Figure 4:
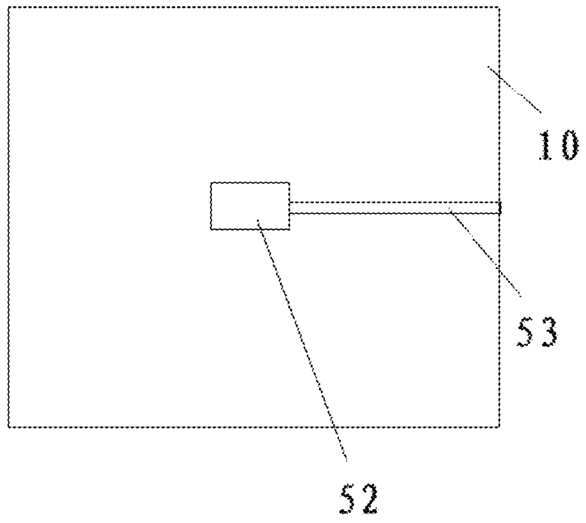
FIG. 4 is a schematic diagram of arrangement of a second capacitor plate.

In some embodiments, as shown in FIGS. 1 and 2, centers of the first capacitor plate 51 and the second capacitor plate 52 may be located on the optical axis of the lens 20. The optical axis of the lens 20 may be perpendicular to the first capacitor plate 51 and the second capacitor plate 52. The first capacitor plate 51 and the second capacitor plate 52 may be spaced apart in parallel, which is conducive to obtaining the relative position change between the first capacitor plate 51 and the second capacitor plate 52 based on the change in capacitance of the capacitor assembly 50, thus obtaining the distance between the photosensitive chip 40 and the lens 20. The centers of the first capacitor plate 51 and the second capacitor plate 52 may be located on the optical axis of the lens 20, under no impact of structural cumulative tolerance, with the only need to calibrate the noise of the capacitor, thus allowing for a high signal-to-noise ratio.

In some other embodiments, as shown in FIGS. 1 and 2, the substrate 30 may be a circuit board. The first capacitor plate 51 is electrically connected to the substrate 30. The camera module may further include a connection plate 53, which may be a flexible circuit board. The connection plate 53 is electrically connected to the second capacitor plate 52. One end of the connection plate 53 may be electrically connected to the second capacitor plate 52, and the other end of the connection plate 53 may be electrically connected to the hard-soft combined circuit board 54. The connection plate 53 can transmit electrical signals to facilitate the detection of the capacitance change of the capacitor assembly 50. The connection plate 53 may be a serpentine, straight, hollow, or elastic connection structure.

In the embodiments of this application, areas of orthographic projections of the first capacitor plate 51 and the second capacitor plate 52 on the substrate 30 are equal, and the orthographic projections of the first capacitor plate 51 and the second capacitor plate 52 on the substrate 30 overlap. This is conducive to accurately obtaining the change in capacitance of the capacitor assembly 50, such that the relative position change between the first capacitor plate 51 and the second capacitor plate 52 can be accurately obtained, so as to obtain the distance between the photosensitive chip 40 and the lens 20.

The camera module may include at least one of a first drive mechanism and a second drive mechanism. Alternatively, the camera module may include a first drive mechanism, the first drive mechanism being connected to the substrate 30. The first drive mechanism can be used to drive the substrate 30 to move. The first drive mechanism may include an electromagnetic motor, a piezoelectric motor, or a shape memory alloy motor. The first drive mechanism may include a shape memory alloy component through which the substrate 30 can be driven to move via the shape memory alloy component. The first drive mechanism may include a piezoelectric material component through which the substrate 30 can be driven to move via the piezoelectric material component. Movement of the substrate 30 can drive the photosensitive chip 40 to move, so as to adjust the distance between the lens 20 and the photosensitive chip 40, thereby achieving focus.

Optionally, the camera module may further include a second drive mechanism, the second drive mechanism being connected to the lens 20. The second drive mechanism is configured to drive the lens 20 to move. For example, the second drive mechanism can be used to drive the lens 20 to move along the optical axis direction of the lens 20. The second drive mechanism may include a motor through which the lens 20 can be driven to move along the optical axis direction of the lens 20 through the motor, to adjust the distance between the lens 20 and the photosensitive chip 40, thereby achieving zoom.

In the embodiments of this application, as shown in FIG. 1, the camera module may further include a first drive mechanism. The first drive mechanism may include a first magnet 61 and a second magnet 62. The number of each of the first magnet 61 and the second magnet 62 may be one or more. The first magnet 61 may be arranged on the base 10, and the second magnet 62 may be arranged on the substrate 30. The first magnet 61 and the second magnet 62 can magnetically attract or repel each other. Through the magnetic force between the first magnet 61 and the second magnet 62, the first magnet 61 and the second magnet 62 can magnetically attract or repel each other, enabling the substrate 30 to move along the optical axis direction of the lens 20, such that the distance between the lens 20 and the photosensitive chip 40 can be achieved, thus achieving zoom. The second magnet 62 may be a coil, which may be a single coil, double coils, or multiple coils. In a case of energizing the coil, the coil generates magnetism, causing a magnetic force between the coil and the first magnet 61, thus making the first magnet 61 and the second magnet 62 magnetically attract or repel each other. The coil is electrically connected to the substrate 30 through which current can be input to the coil as needed, making the first magnet 61 and the second magnet 62 magnetically attract or repel each other. Through the magnetic force between the first magnet 61 and the second magnet 62, the substrate 30 can move along the optical axis direction of the lens 20. The first magnet 61 may be a magnet that is not limited in quantity. The magnet may be a four-sided magnet, a double-sided magnet, or a diagonal magnet.

In a case that the first magnet 61 and the second magnet 62 magnetically attract each other, the base 10 can approach the lens 20 along the optical axis direction of the lens 20. In a case that the first magnet 61 and the second magnet 62 repel each other, the base 10 can leave the lens 20 along the optical axis direction of the lens 20. Through the magnetic force between the first magnet 61 and the second magnet 62, the substrate 30 can be driven to move along the optical axis direction of the lens 20, adjusting the distance between the lens 20 and the photosensitive chip 40, thus achieving zoom.

In some embodiments, as shown in FIG. 1, the camera module may further include a bracket 70, the bracket 70 being arranged on the substrate 30. The bracket 70 may be disposed on a side of the substrate 30 close to the lens 20. The bracket 70 has a placement groove 71. The photosensitive chip 40 is arranged in the placement groove 71. The second magnet 62 is arranged on the bracket 70 and may be disposed at a position corresponding to the first magnet 61 on the bracket 70. The photosensitive chip 40 may be arranged on a bottom wall of the placement groove 71, preventing the photosensitive chip 40 from being damaged.

Optionally, as shown in FIG. 1, the base 10 may have an accommodating cavity 11. The substrate 30 and the photosensitive chip 40 are arranged in the accommodating cavity 11. The bracket 70 is arranged in the accommodating cavity 11. The first magnet 61 may be arranged on an inner side wall of the accommodating cavity 11. The accommodating cavity 11 can protect the substrate 30, the lens 20, and the photosensitive chip 40, preventing them from being affected and damaged by external factors. The base 10 may be formed of a steel sheet. The accommodating cavity 11 on the base 10 can protect the substrate 30, the lens 20, and the photosensitive chip 40. The second capacitor plate 52 may be glued to the bottom wall of the accommodating cavity 11. The substrate 30 may be a circuit board. During designing of the circuit board, a copper sheet of a certain size and shape can be designed on the bottommost metal layer of the circuit board. In the production process diagram, green oil window design can be made to expose the copper sheet as the first capacitor plate 51.

Optionally, as shown in FIG. 1, the camera module may further include a filter 80. The filter 80 is arranged between the lens 20 and the photosensitive chip 40. The filter 80 may be arranged at the bottom of the lens 20. The filter 80 can filter out unwanted light.

In some embodiments, as shown in FIG. 1, the camera module may further include a bracket 70. The bracket 70 may be arranged on the substrate 30. The bracket 70 is arranged in the accommodating cavity 11. The bracket 70 may be disposed on a side of the substrate 30 close to the lens 20. The bracket 70 has a placement groove 71. The photosensitive chip 40 may be arranged in the placement groove 71. A support table 72 may be arranged on an inner side wall of the placement groove 71. The support table 72 may extend along a circumferential direction of the inner side wall of the placement groove 71. The filter 80 is arranged on the support table 72. The support table 72 can support the filter 80. The filter 80 and the photosensitive chip 40 may be spaced apart or parallel to each other. The filter 80 arranged on the support table 72 can seal the placement groove 71, and also protect the photosensitive chip 40, preventing the photosensitive chip 40 from being damaged.

Optionally, the camera module may further include a detection module, the detection module being configured to detect a change in capacitance of the capacitor assembly 50. Based on the change in capacitance of the capacitor assembly 50, the change in distance between the first capacitor plate 51 and the second capacitor plate 52 can be obtained, thus obtaining a change in distance between the photosensitive chip 40 and the lens 20.

Figure 5:
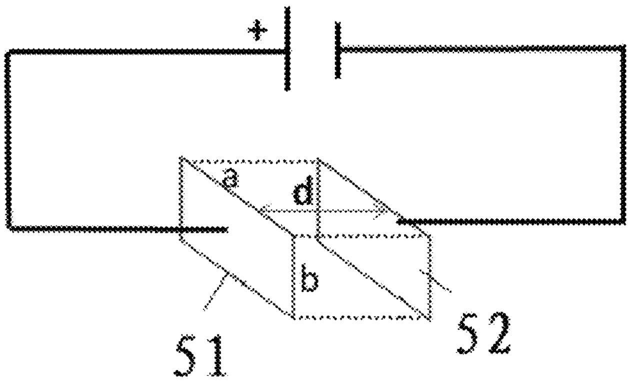
FIG. 5 is a schematic connection diagram of a capacitor.

In application, as shown in FIG. 5, the capacitor assembly 50 includes a first capacitor plate 51 and a second capacitor plate 52. The first capacitor plate 51 and the second capacitor plate 52 are spaced apart in parallel. The first capacitor plate 51 and the second capacitor plate 52 are metal plates of the same shape and size. The length of the first capacitor plate 51 is a, the width is b, and the distance between the first capacitor plate 51 and the second capacitor plate 52 is d. The first capacitor plate 51 and the second capacitor plate 52 can be connected a power source via wires.

The working characteristics of the capacitor: The capacitance C of the capacitor is given by $C=\varepsilon S/4\pi kd$, where $\varepsilon$ represents a dielectric constant of a medium, k represents an electrostatic constant, S represents an area of the two capacitor plates facing each other, S=a*b, and d represents a vertical distance between the two capacitor plates.

Changing S or d can cause a change ΔC in capacitance C. According to the parallel plate capacitor, the change in distance d between the two capacitor plates can be converted into a change in capacitance C. Based on the change in capacitance C, the change in distance d between the capacitor plates can be obtained, thereby obtaining the change in distance between the photosensitive chip 40 and the lens 20. During focus, the distance between the photosensitive chip 40 and the lens 20 can be adjusted, and movement of the substrate 30 can drive the photosensitive chip 40 to move, enabling the photosensitive chip 40 to move to a proper position, so that the lens 20 and the photosensitive chip 40 are in reasonable relative positions, achieving focus. The capacitors can achieve closed-loop feedback operation of the focusing system. The closed-loop feedback system with capacitors has a simple structure design and a small amount of components, not affecting the module space, has a simple process as well as low costs, and causes no magnetic interference problems and no temperature drift problems.

In application, the camera module can achieve closed-loop focusing via position change with capacitive feedback. The specific workflow may be as follows:

Turn on the camera module for shooting.

In the camera preview mode, first determine an initial position of the substrate in the module; second, determine whether a photo scene is clear; in a case that it is clear, perform shooting directly; or in a case that it is not clear, proceed to the next step.

Use a focusing algorithm of the imaging system to search for and record the position of the substrate in the corresponding module when a picture is clear.

Use a controller drive chip to issue an instruction to the drive mechanism based on the recorded position of the substrate when the picture is clear.

After receiving the instruction, the drive mechanism provides a certain amount of control to the substrate to move it to an instructed position.

The closed-loop feedback system can feed back a current distance between the two capacitor plates to a comparator that conducts comparison.

After receiving the feedback amount, the imaging system determines whether the substrate has moved to the instructed position; in a case that it has reached the instructed position, shooting is performed; or in a case that it has not reached the instructed position, the above steps are re-executed.

An embodiment of this application provides a control method of camera module, which is applied to the camera module described in the above embodiments. The control method includes:

detecting a change in capacitance of the capacitor assembly 50; and controlling, based on the detected change in capacitance of the capacitor assembly 50, the substrate 30 to move along an optical axis direction of the lens 20.

The relative position change between the first capacitor plate 51 and the second capacitor plate 52 can be obtained based on the change in capacitance of the capacitor assembly 50, thereby obtaining a distance between the photosensitive chip 40 and the lens 20. During focusing, the distance change between the photosensitive chip 40 and the lens 20 can be obtained based on the change in capacitance of the capacitor assembly 50.

Figure 6:
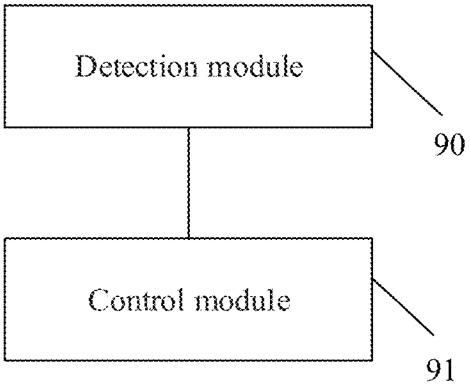
FIG. 6 is a schematic connection diagram of a control apparatus of a camera module.

As shown in FIG. 6, an embodiment of this application provides a control apparatus of camera module, which is applied to the camera module described in the above embodiments. The control apparatus includes:

a detection module 90 configured to detect a change in capacitance of the capacitor assembly 50; and a control module 91 configured to control, based on the detected change in capacitance of the capacitor assembly 50, the substrate 30 to move along an optical axis direction of the lens 20.

The detection module 90 can detect the change in capacitance of the capacitor, and the control module 91 can control the substrate 30 to move along the optical axis direction of the lens 20 based on the detected change in capacitance of the capacitor assembly 50. The relative position change between the first capacitor plate 51 and the second capacitor plate 52 can be obtained based on the change in capacitance of the capacitor assembly 50, thereby obtaining a distance between the photosensitive chip 40 and the lens 20. During focusing, the distance change between the photosensitive chip 40 and the lens 20 can be obtained based on the change in capacitance of the capacitor assembly 50.

An embodiment of this application provides an electronic device, including a processor and a memory. The memory stores a program or instructions capable of running on the processor. When the program or instructions are executed by the processor, the steps of the method according to the foregoing embodiment are implemented.

An embodiment of this application provides a readable storage medium. The readable storage medium stores a program or instructions. When the program or instructions are executed by a processor, the steps of the method according to the foregoing embodiment are implemented.

An embodiment of this application provides an electronic device, including the foregoing camera module according to the foregoing embodiment. An electronic device having the camera module described in the above embodiments is advantageous for miniaturization, has reduced magnetic interference, is less affected by temperature drift, has low cost, and provides good imaging performance and user experience.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A camera module, comprising:

a base;

a lens, wherein the lens is disposed on the base;

a substrate, wherein the substrate and the lens are sequentially arranged along an optical axis direction of the lens, and the substrate is movable along the optical axis direction of the lens;

a photosensitive chip, wherein the photosensitive chip is disposed on the substrate, and the photosensitive chip is located between the lens and substrate; and a capacitor assembly, wherein the capacitor assembly comprises a first capacitor plate and a second capacitor plate, the first capacitor plate is disposed on the substrate, the second capacitor plate is disposed on the base, and the first capacitor plate is opposite the second capacitor plate;

wherein centers of the first capacitor plate and the second capacitor plate are located on an optical axis of the lens.

2. The camera module according to claim 1, wherein the first capacitor plate and the second capacitor plate are spaced apart in parallel.

3. The camera module according to claim 1, wherein the substrate is a circuit board, the first capacitor plate is electrically connected to the substrate, and the camera module further comprises:

a connection plate, wherein the connection plate is a flexible circuit board, and the connection plate is electrically connected to the second capacitor plate.

4. The camera module according to claim 1, wherein orthographic projections of the first capacitor plate and the second capacitor plate on the substrate have a same area, and the orthographic projections of the first capacitor plate and the second capacitor plate on the substrate overlap.

5. The camera module according to claim 1, further comprising:

at least one of a first drive mechanism or a second drive mechanism, wherein the first drive mechanism is connected to the substrate, the first drive mechanism is configured to drive the substrate to move, the second drive mechanism is connected to the lens, and the second drive mechanism is configured to drive the lens to move;

wherein the first drive mechanism includes an electromagnetic motor, a piezoelectric motor, or a shape memory alloy motor; the second drive mechanism includes a motor.

6. The camera module according to claim 1, further comprising a first drive mechanism, wherein the first drive mechanism comprises:

a first magnet, the first magnet being disposed on the base; and a second magnet, wherein the second magnet is disposed on the substrate, and the first magnet and the second magnet are magnetically attractable or repulsive to each other; wherein in a case that the first magnet and the second magnet are magnetically attractable to each other, the base approaches the lens along the optical axis direction of the lens; and in a case that the first magnet and the second magnet are magnetically repulsive to each other, the base leaves the lens along the optical axis direction of the lens.

7. The camera module according to claim 6, further comprising:

a bracket, wherein the bracket is disposed on the substrate, the bracket is provided with a placement groove, the photosensitive chip is disposed in the placement groove, and the second magnet is disposed on the bracket.

8. The camera module according to claim 1, wherein the base has an accommodating cavity, and the substrate and the photosensitive chip are disposed in the accommodating cavity.

9. The camera module according to claim 1, further comprising:

a filter, wherein the filter is disposed between the lens and the photosensitive chip.

10. The camera module according to claim 9, further comprising:

a bracket, wherein the bracket is disposed on the substrate, the bracket is provided with a placement groove, the photosensitive chip is disposed in the placement groove, an inner side wall of the placement groove is provided with a support table, and the filter is disposed on the support table.

11. A control method, applied to a camera module, wherein the camera module comprises:

a base;

a lens, wherein the lens is disposed on the base;

a substrate, wherein the substrate and the lens are sequentially arranged along an optical axis direction of the lens, and the substrate is movable along the optical axis direction of the lens;

a photosensitive chip, wherein the photosensitive chip is disposed on the substrate, and the photosensitive chip is located between the lens and substrate; and a capacitor assembly, wherein the capacitor assembly comprises a first capacitor plate and a second capacitor plate, the first capacitor plate is disposed on the substrate, the second capacitor plate is disposed on the base, and the first capacitor plate is opposite the second capacitor plate;

wherein the control method of camera module comprises:

detecting a change in capacitance of the capacitor assembly; and controlling, based on the detected change in capacitance of the capacitor assembly, the substrate to move along the optical axis direction of the lens;

wherein centers of the first capacitor plate and the second capacitor plate are located on an optical axis of the lens.

12. The control method of camera module according to claim 11, wherein the first capacitor plate and the second capacitor plate are spaced apart in parallel.

13. The control method of camera module according to claim 11, wherein the substrate is a circuit board, the first capacitor plate is electrically connected to the substrate, and the camera module further comprises:

a connection plate, wherein the connection plate is a flexible circuit board, and the connection plate is electrically connected to the second capacitor plate.

14. The control method of camera module according to claim 11, wherein orthographic projections of the first capacitor plate and the second capacitor plate on the substrate have a same area, and the orthographic projections of the first capacitor plate and the second capacitor plate on the substrate overlap.

15. An electronic device, comprising a processor and a memory, wherein the memory stores a program or instructions capable of running on the processor, wherein the program or instructions, when executed by the processor, cause the electronic device to perform a control method applied to a camera module, wherein the camera module comprises:

a base;

a lens, wherein the lens is disposed on the base;

a substrate, wherein the substrate and the lens are sequentially arranged along an optical axis direction of the lens, and the substrate is movable along the optical axis direction of the lens;

a photosensitive chip, wherein the photosensitive chip is disposed on the substrate, and the photosensitive chip is located between the lens and substrate; and a capacitor assembly, wherein the capacitor assembly comprises a first capacitor plate and a second capacitor plate, the first capacitor plate is disposed on the substrate, the second capacitor plate is disposed on the base, and the first capacitor plate is opposite the second capacitor plate;

wherein the control method of camera module comprises:

detecting a change in capacitance of the capacitor assembly; and controlling, based on the detected change in capacitance of the capacitor assembly, the substrate to move along the optical axis direction of the lens;

wherein centers of the first capacitor plate and the second capacitor plate are located on an optical axis of the lens.

16. The electronic device according to claim 15, wherein the first capacitor plate and the second capacitor plate are spaced apart in parallel.

* * * * *